United States Patent [19]
Nilsson

[11] Patent Number: 5,541,401
[45] Date of Patent: Jul. 30, 1996

[54] ARRANGEMENT FOR IMAGE GENERATION AND/OR READING HAVING PIXEL MATRICES OF DIFFERING DENSITIES

[75] Inventor: Olle Nilsson, Fjärås, Sweden

[73] Assignee: Telefonaktiebolaget LM Ericsson, Stockholm, Sweden

[21] Appl. No.: 298,975

[22] Filed: Sep. 2, 1994

[30] Foreign Application Priority Data

Sep. 3, 1993 [SE] Sweden .................................. 9302845

[51] Int. Cl.$^6$ ...................................................... H01J 40/14
[52] U.S. Cl. ................... 250/208.1; 250/214 P; 345/32
[58] Field of Search ........................... 250/208.1, 214.1, 250/214 P, 214 LS; 345/31, 32, 33, 38; 348/343, 344, 750, 751, 790, 261; 359/212–215, 223, 225–226, 872, 876

[56] References Cited

U.S. PATENT DOCUMENTS

| | | | |
|---|---|---|---|
| 4,225,862 | 9/1980 | Johnson | 345/31 |
| 4,311,999 | 1/1982 | Upton et al. | 345/31 |
| 4,831,370 | 5/1989 | Smoot | 345/31 |
| 4,931,786 | 6/1990 | Selby, III | 345/31 |
| 4,934,773 | 6/1990 | Becker | 345/31 |
| 5,276,546 | 1/1994 | Palm et al. | 359/202 |
| 5,281,960 | 1/1994 | Dwyer, III | 345/31 |
| 5,294,940 | 3/1994 | Wennagel et al. | 345/31 |

FOREIGN PATENT DOCUMENTS

| | | |
|---|---|---|
| 505730 | 9/1992 | European Pat. Off. . |
| 2605821 | 9/1982 | Germany . |
| 1512463 | 6/1978 | United Kingdom . |

OTHER PUBLICATIONS

Johnson, "Dual–Arm Cantilevered Springs for Vibrating LED Display," IBM Technical Disclosure Bulletin, vol. 22, No. 11 (Apr. 1980), p. 4748.
Bailey et al., "Synchronized Display," IBM Technical Disclosure Bulletin, vol. 21, No. 1 (Jun. 1978), p. 253.
Voit, Jr., "One–Line LED Display," IBM Technical Disclosure Bulletin, vol. 21, No. 2 (Jul. 1978), p. 726.
Fisher et al., "Vibrating Display Unit," IBM Technical Disclosure Bulletin, vol. 22, No. 1 (Jun. 1979), pp. 6–8.

*Primary Examiner*—Que T. Le
*Attorney, Agent, or Firm*—Burns, Doane, Swecker & Mathis, L.L.P.

[57] ABSTRACT

An arrangement e.g. for image generation and/or reading has first and second light element arranged substantially in two dimensions, control and addressing devices for activation of light or picture elements wherein at least the first light elements are real and form a thin matrix and the second light elements form a denser matrix wherein the position of each first light element at a given time corresponds to the position of a second light element. The addressing devices are spatially arranged or connected to at least each first element, and first as well as second light or picture elements are activated via said control and addressing devices. Activation of the second light or picture elements which at the given time are located at a distance from a first light or picture element which maximally corresponds to the distance between two adjacent first light or picture elements by the respective addressing device is through effective real or fictive displacement of the matrix formed by the first light or picture elements.

19 Claims, 4 Drawing Sheets

ARRANGEMENT FOR IMAGE GENERATION AND/OR READING HAVING PIXEL MATRICES OF DIFFERING DENSITIES

BACKGROUND

The present invention relates to an arrangement e.g. for image generation and/or reading which comprises in substantially two dimensions arranged first and second light elements and controlling and addressing means for activating light or picture elements. The first light or picture elements are real and form a thin matrix. The second elements are also real and form a matrix which is denser.

The invention further relates to a display and to a detecting arrangement for reading images.

Devices are known in the form of a display or even in the form of arrangements for e.g. optical, magnetical or electrical reading. In some applications it can be required or be desirable to have e.g. a display which has a very small total area but wherein the number of picture- or light elements however is very high, e.g. a display in the form of a matrix with for example 1000×1000 light elements on a surface which may be 1 cm$^2$ or even smaller. Since all light elements, for example liquid crystal elements, require individual addressing and feeding etc. it is very hard to produce a similar matrix due to the difficulties in achieving individual addressing, feeding etc. to all the elements on such a small area. Generally the problems are the same for devices for image generation as well as for reading and the difficulties in addressing, feeding etc. are similar independently of whether it is question about an arrangement of the one or the other kind.

In a number of known arrangements linear arrangements or "arrays" are used, such as light elements or sources arranged in one or more rows which are swept so that a matrix is formed. If the total area of the matrix formed is to be very small and at the same time the number of light elements is to be high, the linearly arranged which is light elements must be very densely arranged why the addressing gets very difficult. Furthermore the linear device of light elements or light sources has to be moved or swept a comparatively long distance which is a considerable drawback. This in turn leads to that the sweep also has to take place with a comparatively high speed.

If for example it is needed to move a display in the form of a matrix of e.g. 1000×1000 liquid crystal elements and the surface has to be smaller than 1 cm$^2$, which may be necessary in a number of applications, a pixel size of 10×10 μm or smaller is obtained, which as mentioned above is very difficult, if possible at all, to achieve depending on addressing and feeding problems etc.

An example of a linear arrangement as referred to above is shown in U.S. Pat. No. 4,225,862. In this document a display unit comprises a number of light sources, for example LEDs, which are arranged linearly. The light sources which are arranged in a row are oscillated vertically, i.e. in one direction or in one dimension, in order to provide a display. According to this document it is also possible to arrange the light sources in a number of parallel rows. Also in this case the light elements are closely arranged and oscillate or are swept merely in one dimension or in one direction. Therethrough also in this case the distance that the spots are moved will be long.

In U.S. Pat. No. 4,934,773 a miniature-video-display is disclosed which comprises light emitting elements arranged in at least one row, an amplifying lens and a vibrating mirror. The light elements (LED) are illuminated selectively at different points during the translation of the vibrating mirror wherethrough rows of pixels are projected on selected spots of the mirror so that a two dimensional image is obtained. According to this document the light emitting elements may also be arranged in two or more rows. The intention therewith is that those should have different colours so that a colour image can be provided. This document also describes an arrangement in combination with an optical system wherein the sweep not is real but achieved in an optical way. Also in this case, if a small display with a high resolution is required, must therefore the light elements be very closely arranged which is problematic depending on difficulties in physically arranging and mounting as well as in addressing and feeding the closely arranged light elements.

SUMMARY

The object with the present invention is to provide an arrangement for image generation and/or reading as initially stated which for example can be very small and at the same time have a very high resolution. It is also an object with the invention to provide an arrangement which is easy to arrange and to mount. Still another object with the present invention is to provide an arrangement wherein the size and the resolution are not limited by the addressing and feeding technique to separate light elements or picture elements. Another object with the invention is to provide an arrangement wherein separate light- or picture element merely are displaced virtually, a very short distance. It is also an object with the invention to provide an arrangement which is not complicated or complex. The arrangement is furthermore to be reliable and cheap to produce.

Those as well as other objects are achieved through an arrangement which comprises first and second light elements arranged substantially in two dimensions and controlling and addressing means for activation of the light- or picture elements. The first light- or picture elements are real and form a thin matrix and the second light- or picture elements are real and form a denser matrix. The controlling and addressing means are connected only to each first light- or picture elements and first as well as second light- or picture elements are controlled and activated via said control- and addressing means. Activation of second light- or picture elements takes place indirectly and successively during a time interval Δt and only those second light- or picture elements which at a given time ($t_0$) are located within a distance from a first light- or picture element which maximally corresponds to a given distance between two adjacent first light- or picture elements are activated by the controlling and addressing means belongings to the first light- or picture element. The activation is through simultaneous, effective, fictive displacement of the matrix formed by first light- or picture elements in essentially two directions or dimensions in such a way that, in addition to all first light element, also all second light- or picture elements are activated during the time interval Δt.

Still another object with the invention is to provide a display. A further object with the present invention is to provide a detecting arrangement fulfilling the objects referred to in the foregoing.

According to an advantageous embodiment the second light- or picture elements are arranged substantially in a square around the first light- or picture element whereupon the matrix formed by first light elements is displaced fictively in two dimensions. According to one embodiment the second light elements are fictive and activated so that the whole matrix surface is covered through fictive simultaneous displacement of the whole matrix formed by the first light- or picture elements. According to one embodiment the first light- or picture elements comprise modulatable elements, particularly the spaced matrix formed by the first light- or picture elements is displaced synchronously with the modulation of the first light- or picture elements. According to one embodiment the first light elements comprise light sources. Even more particularly the light sources comprise light emitting diodes, LED, illuminated liquid crystal elements etc. In one embodiment the distance between adjacent first light elements is about 100 µm and the fictive displacement of the spaced matrix likewise reaches maximally about 100 µm. According to a further embodiment the total area of the spaced matrix may reach about 1 cm² whereas according to another embodiment it is possible to print whole pages for example in the dimensions 20×20 or 20×30 cm. Of course other dimensions can as well be used. According to another embodiment of the invention the first light- or picture elements comprise light detectors. Particularly the spaced matrix formed by the first light elements may or picture elements be effectively displaced in the plane of the matrix synchronously with the reading of the light detectors.

Still further each first light- or picture element may be physically divided to comprise first light- or picture elements and substantially adjacent second light- or picture elements and each first light- or picture element and its respective second light- or picture element are fed in a real way so that a moving light source with a variable intensity is obtained. The feeding can be effected through a sweeping signal which is common for all first light- or picture elements. According to a particular embodiment the arrangement is so formed that the whole sweep (to cover the whole surface) is carried out during the time interval $\Delta t$ and takes about 1/50 s.

According to one embodiment the arrangement forms a display whereas it according to another embodiment forms a detector for image reading, an image reader. According to further embodiments the arrangement is used in a camera, a copy-machine etc.

BRIEF DESCRIPTION OF THE DRAWINGS

The invention will in the following be further described under reference to the accompanying drawings in an explanatory and by no means limiting way, wherein FIG. 1 generally illustrates a matrix formed by cells with first and second light-, or picture elements.

DETAILED DESCRIPTION

Figure 1:
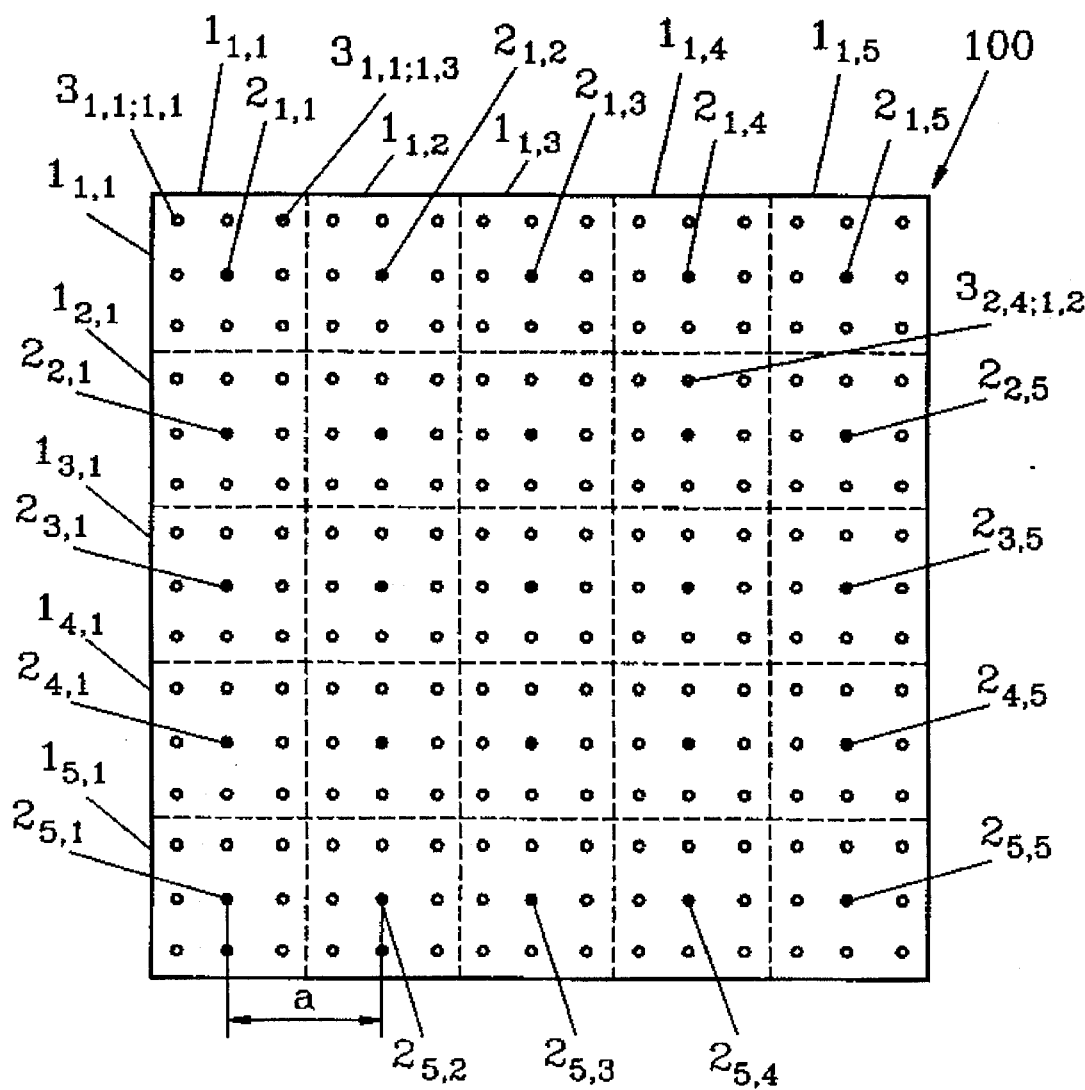
FIG. 1a illustrates an example of a sweep in a cell with a first light- or picture element and thereto belonging second light- or picture elements.
FIG. 1b illustrates an alternative embodiment of a sweep in a cell with first and second light- or picture elements.
FIG. 1c illustrates a further example of how a sweep can be effected in a cell with first and second light- or picture elements.
Figure 4:
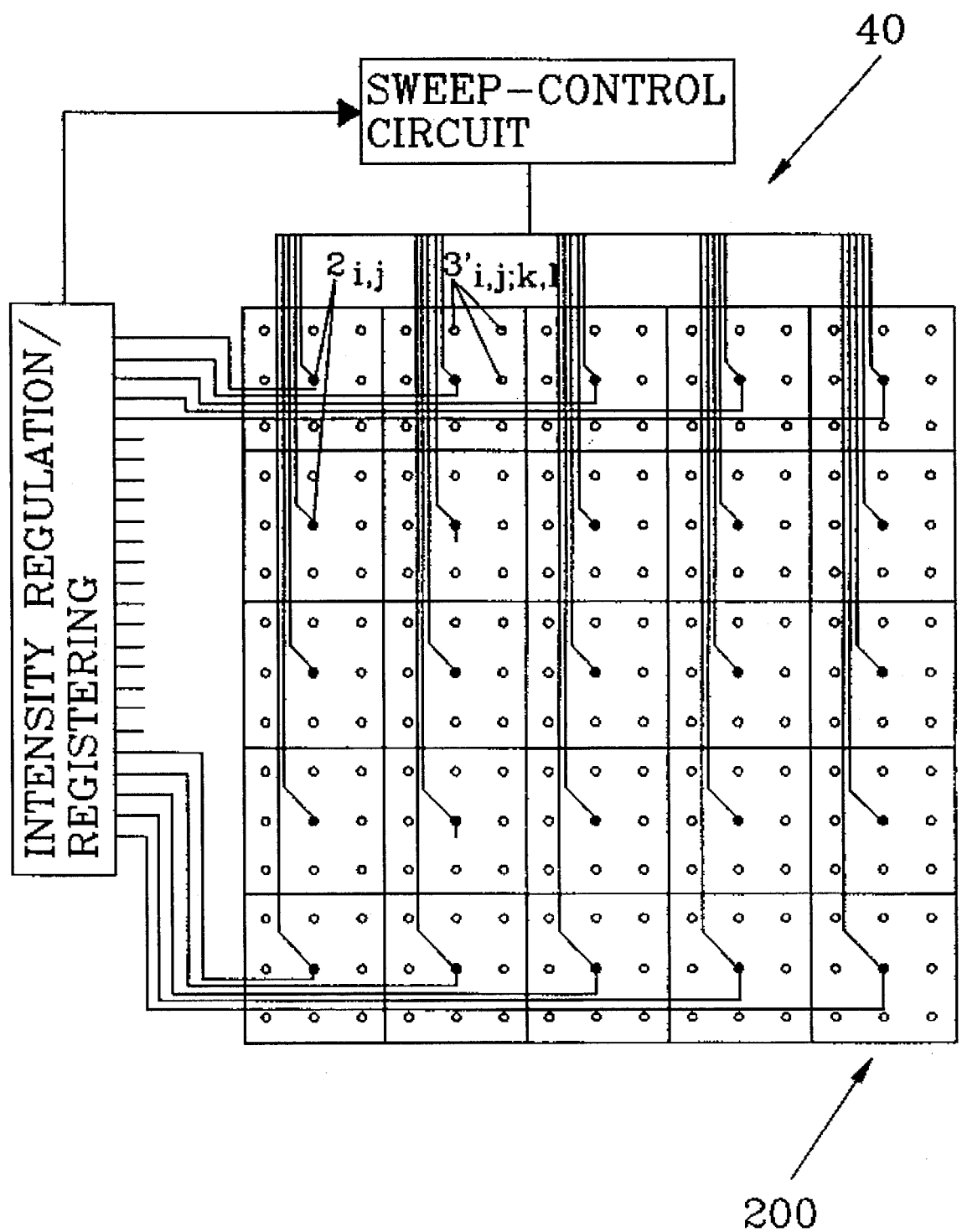

FIG. 1 illustrates the principle of an arrangement 100 comprising first and second light- or picture elements arranged substantially in two dimensions. The light- or picture elements are according to the shown embodiment arranged regularly. The light- or picture elements can be said to form, or to be arranged in different cells $1_{i,j(i,j=1,\ldots,5)}$ wherein each cell comprises a first light element $2_{i,j(i,j=1,\ldots,5)}$ and a number of second elements $3_{i,j(i,j=1,\ldots,5);k,1\ (k,1=1,2,3)}$ which can be said to belong to or depend on the first light element $2_{i,j}$. In FIG. 1 is schematically illustrated a matrix formed by different cells $1_{i,j}$ whereas in FIGS. 1a to 1c different examples are shown illustrating how a cell, for example $1_{i,j}$ can be built, and how the sweep can be effected within the respective cell. With a sweep is meant a serial activation according to the embodiment as illustrated in FIG. 4. The second light- or picture elements $3_{i,j;k,1}$ which also can be said to be dependent light- or picture elements are according to the illustrated embodiment regularly arranged within the cell. It could also be possible to arrange those in a non-regular way within the cell. However, according to an advantageous embodiment the different cells forming the matrix are so built that each cell's light- or picture elements are arranged in the same way in all the cells so that a common sweep (see above) of the whole matrix can be carried out, i.e. that it can be displaced in a fictive way simultaneously and uniformly. According to the invention addressing means or addressing devices as well as feeding- and modulation means are merely arranged to each first light- or picture element $2_{i,j}$, or a so called main element. The matrix which is formed by the first light- or picture elements $2_{i,j}$ is a comparatively thin matrix whereas the matrix which is formed by the second light- or picture elements $3_{i,j;k,1}$ forms a much denser matrix. As referred to above the addressing means as well as means for feeding and modulation are only connected to each first light- or picture element $2_{i,j}$.

However both first and second light- or picture elements are activated via said means which in the following sometimes merely are denoted addressing means even if they also may comprise means for feeding and possibly modulation and regulation whereupon the first light- or picture elements $2_{i,j}$ are activated directly whereas the second light- or picture elements $3_{i,j;k,1}$ are activated indirectly via the first light- or picture elements $2_{i,j}$. In FIG. 1 a matrix is illustrated which comprises 25 cells $1_{i,j}$ with all-together 9 light- or picture elements in each cell. Of these 9 light- or picture elements one light- or picture element forms a so called first light- or picture element $2_{i,j}$ whereas the other 8 form so called second light- or picture elements $3_{i,j;k1}$ which belong to the first light- or picture element $2_{i,j}$ of the cell. In the shown embodiment the first light- or picture element $2_{i,j}$ is arranged in the center of each respective cell $1_{i,j}$. In some cases it is advantageous to have a comparatively low "sweeping" frequency which, differently from in a television (one light-source), easily can be obtained with a matrix; if for example the sweeping movement is forward and backgoing the frequency for the forward- and back movement will be higher than the total sweep frequency.

The modulation of the light- or picture elements is obtained in the time domain, during the interval in which the sweep is carried out.

The sweeping movement is according to an advantageous embodiment uniform in one direction, i.e. it is not necessary that for example the light spot stops etc. Thus the movement can be continuous and uniform (c.f. line deflection in an ordinary TV). According to alternative embodiments it is also possible to have a discrete, "chopped" movement.

Figure 1A:
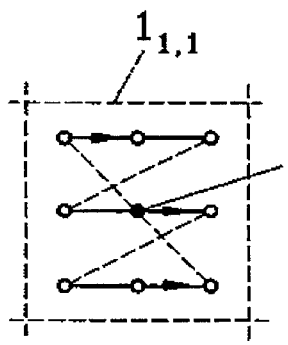

In FIG. 1a is illustrated a cell $1_{1,1}$ as that just described in FIG. 1 with 9 light- or picture elements, i,e, a first light- or picture element $2_{2,2}$ and 8 second light- or picture elements $3_{1,1;k,1(k,1=1,2,3)}$. In the shown embodiment the first light- or picture element $2_{2,2}$ is arranged in the center of the cell whereas the second light- or picture elements are arranged in a regular way around the first light- or picture element. In the figures arrows illustrate an example of how a sweep can be effected across the cell. A complete sweep thus means that each first light- or picture element is swept and passes through all positions for the second light- or picture elements belonging to these first light- or picture element. The addressing means (see above) are connected only to the first light- or picture element (not shown). In an advantageous embodiment the whole matrix may be displaced actively.

Figure 1B:
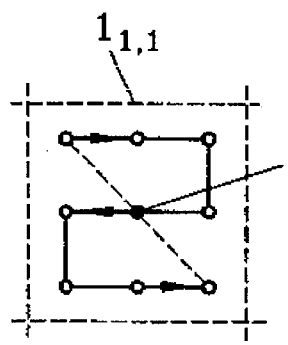
Figure 1C:
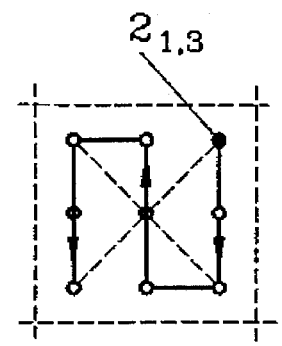

In FIG. 1b is illustrated a second example of a cell $1_{1,1}$ with first and second picture elements and how a sweep can be effected respectively illustrated with arrows in the figure. Also in this embodiment the first light- or picture element $2_{2,2}$ are arranged in the center. FIG. 1c finally illustrates in an illustrative way a further embodiment of how a cell can be built. This embodiment differs from the others in that the first light element $2_{1,3}$ is not arranged centrally in the cell but in another way, in the shown embodiment in a corner. Of course it could also be arranged somewhere else since this does not influence the principle of the invention but merely gives different technical solutions. The displacements or the sweeping movements may also be diagonal or similar, the essential being that all positions, i.e. also the second light- or picture elements which are not directly addressed and fed etc. are covered.

According to the invention the light- or picture elements may comprise light sources. A number of different light sources are of course possible among which among others can be mentioned so called light-emitting diodes, LED, liquid crystal cells with one or more real light sources, multicolour systems etc. The light- or picture elements may also comprise detectors or light detectors.

In the following is given a comparison between a swept linear array and a swept thin matrix according to the invention. The light- or picture elements are herein denoted light elements for reasons of simplicity. For reasons of simplicity the wanted linear resolution, i.e. the number of lines, is supposed to be N whereas the desired size, i.e. the side of a square, is supposed to be L. For a linear array is then required N light elements which all have to be displaced for maximum distance L. They will then moved with a speed $L/\Delta t$.

With a thin matrix (according to the invention) with $n^2$ first light elements or light sources every light source needs to be displaced to $N^2/n^2$ different positions and a distance in x- as well as y-direction, which is $L/n$ and it moves with a speed of $L \cdot N/n^2 \Delta t$. For the linear arrangement the physical distance between two adjacent light sources will be $L/N$ whereas the physical distance between two adjacent light elements in the thin matrix $L/n$ is considerably shorter. The maximum displacement for the linear array will be L whereas the maximum displacement for the thin matrix, i.e. light elements comprised thereby, will be $L \cdot \sqrt{2}/n$. If the total number of light sources, for example $n^2$, is greater than N, i.e. the number of light sources in the linear array, the velocity will be lower for the thin matrix, namely $L \cdot N/n^2 \Delta t$ as compared with $L/\Delta t$ (for the linear arrangement). If further the velocity is lower for the thin matrix, lower power will be required from each light source in order to reach a given total power.

Figure 2:
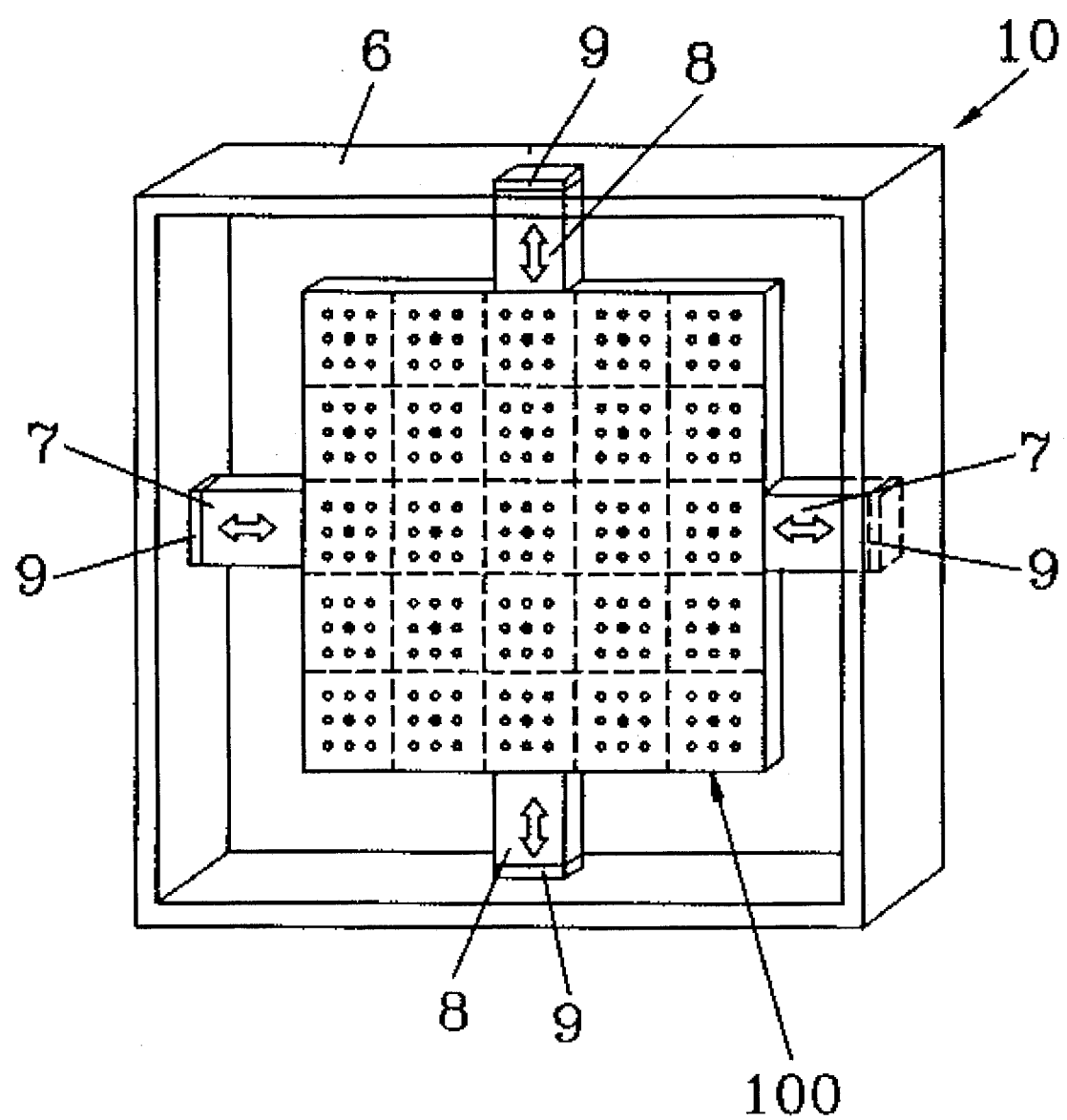
FIG. 2 illustrates an arrangement based on physical displacement of the matrix.

In FIG. 2 an arrangement 10 is illustrated in which the first light- or picture elements are real and form a thin matrix whereas the second light- or picture elements are fictive and form a denser matrix. For reasons of obviousness the elements are not given reference signs in FIG. 2; compare for example FIG. 1. Addressing means or devices as well as means for feeding and modulation etc as mentioned above are spatially arranged only to each first light- or picture element and first as well as second light- or picture elements are activated via said means wherein the activation of the second light- or picture elements is effected indirectly during the time interval Δt during which each cell within the matrix simultaneously is exposed to an effective, displacement and during which the whole matrix, i.e. each cell separately, is completely covered. FIG. 2 illustrates movable arrangement 100 for example forming a display which is arranged in a fixed frame 6. The moveable display is arranged in the fixed frame 6 through attaching means 7, 7; 8, 8 which are so formed that the frame through displacing means 9 can be moved in two directions so that the whole matrix is covered. The attaching means 7, 7; 8, 8 provide for horizontal 7, 7 and vertical 8, 8 attachment. The displacement is then so small that it maximally corresponds to the distance between two adjacent first light- or picture elements, cf FIG. 1. The displacing means 9 can be formed in a number of different ways and with different technical solutions. Examples thereof are piezo-elements or piezo-devices arranged in connection with the attaching means 7, 7; 8, 8. The displacing means 9 may of course also provide for a displacement in the form of a transverse movement, i.e. a movement parallel with an adjacent edge or similar. The displacement may also be achieved in a number of other ways, for example magnetically, with electromagnets or via magnetostriction etc. The displacing means are in the shown embodiment so arranged that two means provide for vertical displacement whereas two provide for horizontal displacement. The arrangement may also comprise so called position sensing means which are not shown since they as to their function and form may be of any known kind. The addressing as well as means for feeding and modulation etc are also known per se and can be formed in any arbitrary way provided that only each first light- or picture element is directly connected.

Figure 3A:
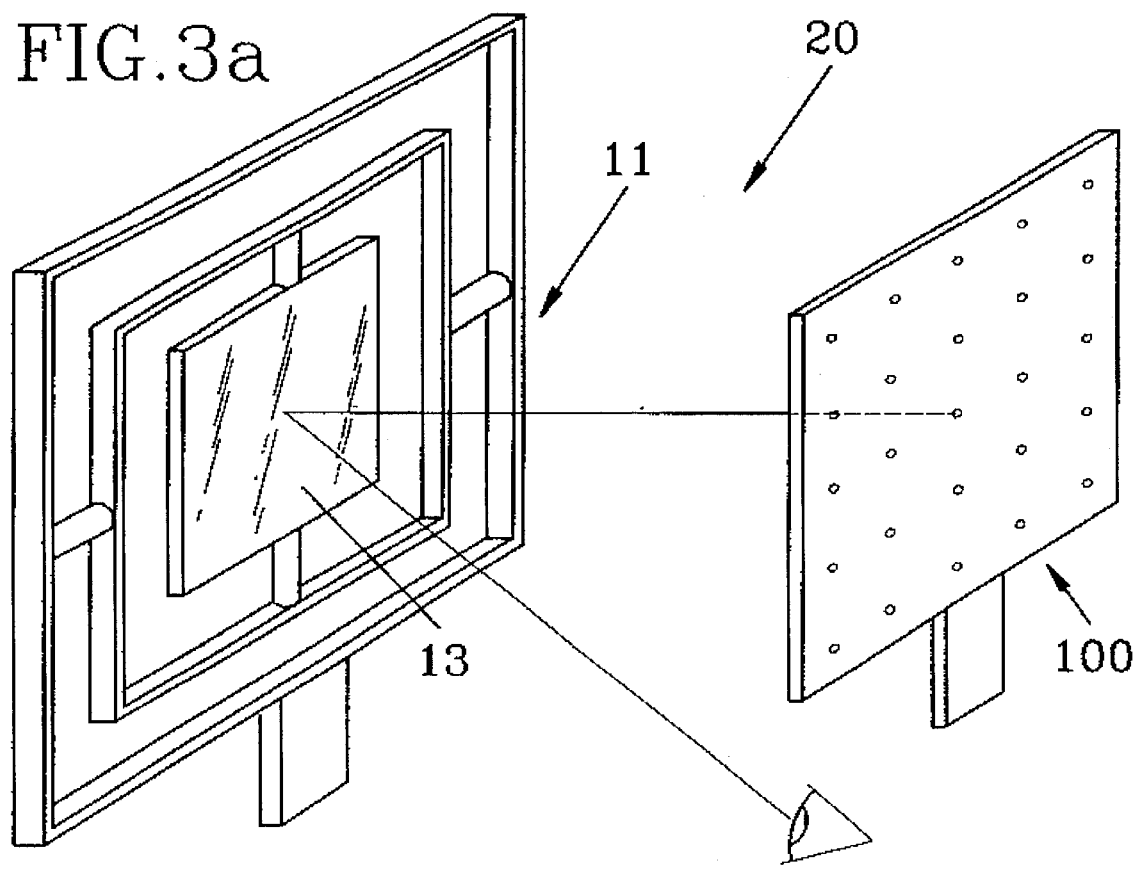
FIG. 3a illustrates an arrangement wherein the displacement of the matrix is fictive and wherein the arrangement comprises an optical system.
Figure 3B:
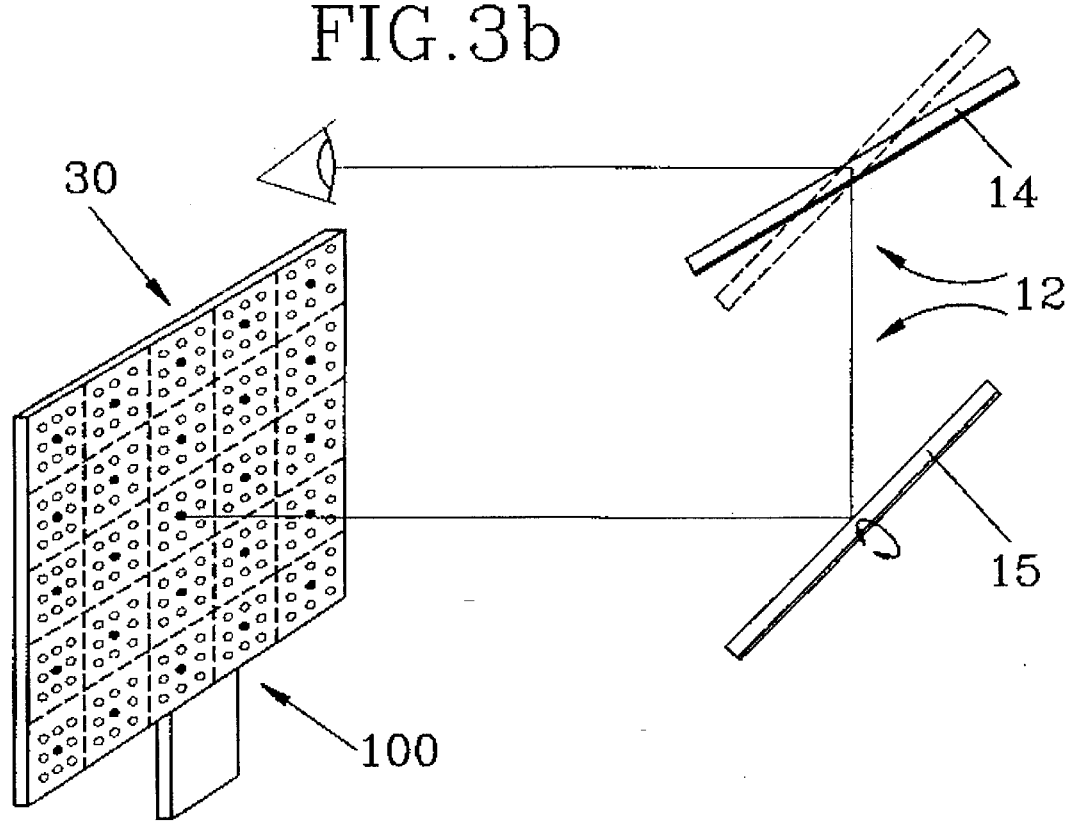
FIG. 3b illustrates a second embodiment of the arrangement according to FIG. 3a with a different optical system and FIG. 4 illustrates an embodiment wherein the second light- or picture elements are real and groupwise belong to a first light- or picture element.

In the embodiment described above the arrangement is thus displaced physically all over the matrix. In FIG. 3a an arrangement will be described wherein the displacement is fictive and wherein the arrangement is comprised in an optical system 11. In FIG. 3a the displacement is achieved via a mirror 13 which can be turned or rotated in two directions and this can of course also be carried out in a number of different ways and in FIG. 3b another example is illustrated of the arrangement 30 comprised in an optical system 12 comprising two mirrors 14, 15. The arrangement may of course also form part of a focusing system comprising lenses, prisms etc. Since the displacements of the mirrors can be very small those can be rotatable, for example via torsion, but also in this case is this essential that the addressing (feeding, modulation etc) only is provided to the first picture- or light elements and that the fictive displacement is so small that it maximally corresponds to a distance (in one direction or dimension) which corresponds to the distance between two adjacent light- or picture elements (see FIG. 1) and that therethrough the whole matrix is covered.

In FIG. 4 an advantageous embodiment is shown wherein the second light- or picture elements $3_{i,j,k,1}$ are real and arranged in groups belonging to a first light- or picture element $2_{i,j}$. The embodiments illustrated in FIGS. 1, 1a–1c are also appropriate in this case. Both first and second light- or picture elements are real and for reasons of simplicity one of the second light- or picture elements is assumed to corresponded to the first light- or picture element or so called main element on which the others depend. The light- or picture elements may thus be seen as physically divided wherein each first light- or picture element is divided for example into a number of separate light- or picture elements which are fed serially via the corresponding first light- or picture element so that a moving light source with a variable intensity is obtained. The addressing and feeding is only provided to each first light- or picture element. The addressing within each cell comprising a first light- or picture element and a number of dependant second light- or picture elements is carried out in the timedomain and the sweeping signal is common for all cells comprised by the matrix.

According to FIG. 4 the sweep is controlled simultaneously and commonly by the first light- or picture element whereas the intensity regulation is separately controlled (but likewise connected to each first light- or picture element). In the case of a detector, registration is relevant instead of intensity regulation. Feeding, modulation etc is not further exemplified since this can be done in ways which are known per se. It is essential that addressing and sweep is carried out simultaneously for all first light- or picture elements wherein to each first light- or picture element belonging (real) second light- or picture elements are serially connected thereto in a way which is known per se. Modulation, the regulation of the intensity (and possibly other functions) are or can be controlled separately. In FIG. 4 is illustrated that the intensities for the light- or picture elements are controlled separately as a function of time whereas "illumination" or sweep as mentioned above is effected synchronously as far as the first light- or picture elements are concerned and sequentially within each respective cell. An arrow between the intensity regulation device/registration and a sweep control circuit indicates that they are synchronized.

As mentioned above according to one embodiment the light- or picture element may comprise for example light sources which can be said to form modulatable lightspots. These are displaced periodically in such a way that each lightspot will take a given number of positions, for example 100, (this however merely gives an example and it is not intended to have any limiting effect), which can be arranged regularly around the "rest positions" or the independent light- or picture element. The result will then be that a matrix is created with 100 times more pixel than the real number of lightspots. This can for example be seen as if each separate lightspot is replaced by a very small quadratic 10-lines cathod-ray-television-picture tube. Thus the physical displacement of the single lightspots are very small. As an example is given a display in the form of a matrix of 1000×1000 liquid crystal elements and with a total surface of about 1 cm$^2$. This would mean a pixelsize of 10×10 μm. In the thin matrix according to the invention the distance between the light-spots could reach about 100 μm wherethrough the necessary maximum displacement maximally would reach about 100 μm. If the matrix is small it can as already referred to above be displaced physically, for example with the use of piezo-elements. If it instead forms part of an optical projecting system, for example an image forming system, the optical axes can instead be deflected, for example with the use of rotatable mirrors as mentioned above. The deflection angle will be very small, in some cases smaller than 1/100 of a radian (see the above mentioned numerical example) whereupon the rotation of the mirrors can be based on torsion.

The arrangement according to the invention can be formed as a display as well as it can be used in printers or for optical, magnetical or electrical reading of two dimensional storages or pictures etc. The arrangement can also form a detector for image reading or form part of a camera or a copy-machine, or for example an arrangement for production of patterns with the use of laser machining.

Through the invention it is for example possible to provide reproduction with a more or less good sharpness. One extreme is that if a good resolution is already present, which however is intended to be somewhat further increased, then it is possible to have a great number of cells (for example about 600×600) with only 4 light/picture elements in each cell. Another extreme can be taken to be four TV-apparatuses aligned with 4 cells with 600×600 picture elements in each, essentially corresponding to TV. It is hereby possible to go from a normal resolution to resolution for HDTV. At reception of an ordinary TV-signal the sweep is omitted and the cell will light as one single unit.

The invention is not limited to the shown embodiments but can be freely varied within the scope of the claims. For example the size of the arrangement, display or anything else, can take many different values, the number of cells as well as the number of elements in the cells is not limited to any particular numbers, the arrangement may for example be very small but it can also according to alternative embodiments be used for printing of whole pages of about tens of cm (for example 20×30 cm) etc. The fictive or virtual movements of the matrix can also be provided in a number of different ways as well as adjacent spots can mean diagonally arranged elements etc. A complete sweep which covers the whole matrix or each cell of the matrix respectively may need different time as well as circuits, feeding etc and can be formed in a number of different ways.

What is claimed is:

1. An imaging arrangement comprising first and second picture elements arranged in respective matrices in substantially two dimensions, controlling and addressing means for activating the first and second picture elements, wherein the first picture elements are real and form a thin matrix;

the second picture elements are real and form a denser matrix;

the position of each first picture element at a given time $t_0$ corresponds to the position of a respective second picture element;

the controlling and addressing means is connected only to each first picture element;

there are activated indirectly and successively during a time interval $\Delta t$ only those second picture elements which do not have respective first picture elements, which at the time $t_0$ are located within a distance from a first picture element which maximally corresponds to the distance between two adjacent first picture elements and which are provided to said first picture element being activated by the controlling and addressing means belongings to said first picture element through simultaneous, effective fictive displacement of the matrix formed by first picture elements in substantially two directions in such a way that in addition to all first picture elements, also all second picture elements are activated once during the time interval $\Delta t$.

2. An arrangement as in claim 1, wherein the first picture elements and the second picture elements are substantially regularly arranged, forming cells each comprising a first picture element and a number of thereto belonging second picture elements.

3. An arrangement as in claim 2, wherein each first picture element is arranged in the center of a respective cell and surrounded by a number of second picture elements.

4. An arrangement as in claim 2, wherein first picture elements are asymmetrically arranged in the cells, whereby each first picture element is asymmetrically surrounded by a number of second picture elements.

5. The arrangement as in claim 1 used in a camera.

6. An arrangement as in claim 1, wherein the first picture elements comprise modulatable light elements.

7. An arrangement as in claim 6, wherein the thin matrix formed by the first picture elements is fictively displaced synchronously with the modulation of the first picture elements.

8. An arrangement as in claim 1, wherein the first picture elements comprise light sources.

9. An arrangement as in claim 8, wherein the light sources comprises light emitting diodes.

10. An arrangement as in claim 8, wherein the first picture elements comprise illuminated liquid crystal elements.

11. An arrangement as in claim 1, wherein the distance between adjacent first picture elements is about 100 μm.

12. An arrangement as in claim 1, wherein a total surface area of the thin matrix is about 1 cm$^2$.

13. An arrangement as in claim 1, wherein the first picture elements comprise light detectors.

14. An arrangement as in claim 13, wherein the thin matrix formed by the light detectors effectively is displaced in the plane of the matrix synchronously with the reading of the light detectors.

15. An arrangement as in claim 1, wherein each first picture element is physically divided so that it comprises a first light element and an adjacent second light element wherein each first light element and thereto belonging second light element are fed serially within each respectively cell so that a moving light source with variable intensity is obtained and wherein a sweeping signal is commonly provided to all first light elements.

16. An arrangement as in claim 15, wherein the first and second light elements are modulated separately.

17. An arrangement as in claim 1, wherein the time interval $\Delta t$ reaches about 1/50 s.

18. A display comprising:
first and second light elements arranged substantially in two dimensions, and
controlling and addressing means for activating the light elements,
wherein the first light elements are real and form a thin matrix and the second light elements are real and form a denser matrix,
wherein the position of each first element at a given time ($t_0$) corresponds to the position of a second light element,
wherein the controlling and addressing means is connected only to each first light element,
wherein first as well as second light element are controlled and activated via said controlling and addressing means,
wherein activation of second light elements takes place indirectly and successively during a time interval $\Delta t$,
wherein those second light elements which at the given time $t_0$ are located within a distance from a first light element which maximally corresponds to the distance between two adjacent first light elements and which are provided to said first light element are activated via the controlling and addressing means belonging to said first light element through simultaneous, effective, fictive displacement of the matrix formed by the first light elements in substantially two directions in such a way that in addition to all first light elements, also all second light elements are activated once during the time interval $\Delta t$.

19. A detecting arrangement for reading images comprising:
first and second light elements arranged substantially in two dimensions,
controlling and addressing means for activating the light elements,
the first light elements being real and forming a thin matrix and the second light elements being real and forming a denser matrix,
wherein the position of each first light element at a given time $t_0$ corresponds to the position of a second light element,
wherein first light elements and second light elements are controlled and activated via said controlling and addressing means,
wherein activation of second light elements takes place indirectly and successively during a time interval $\Delta t$,
wherein those second light elements which at the given time $t_0$ are located within a distance from a first light element which maximally corresponds to the distance between two adjacent first light elements and which are provided to said first light element are activated via the controlling and addressing means belonging to said first light element through simultaneous, effective, fictive displacement of the matrix formed by first light elements in substantially two directions in such a way that in addition to all first light elements, also all second light elements are activated once during the time interval $\Delta t$.

* * * * *